Sept. 26, 1961  P. AMUNDSEN ET AL  3,001,200
EYE PROTECTIVE SPECTACLE TYPE GOGGLES
Filed Oct. 17, 1958
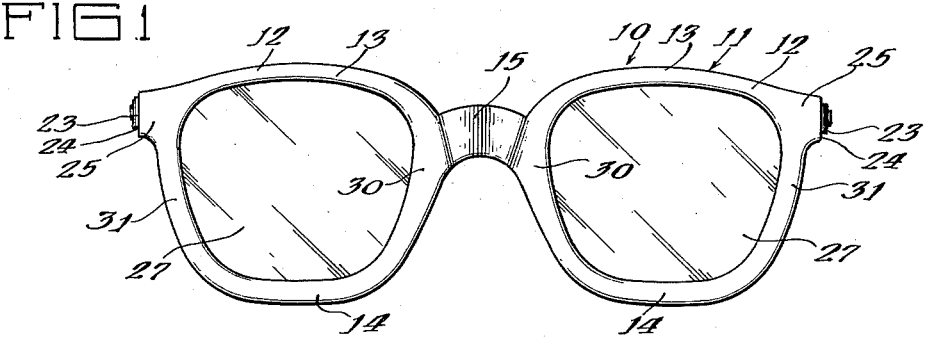
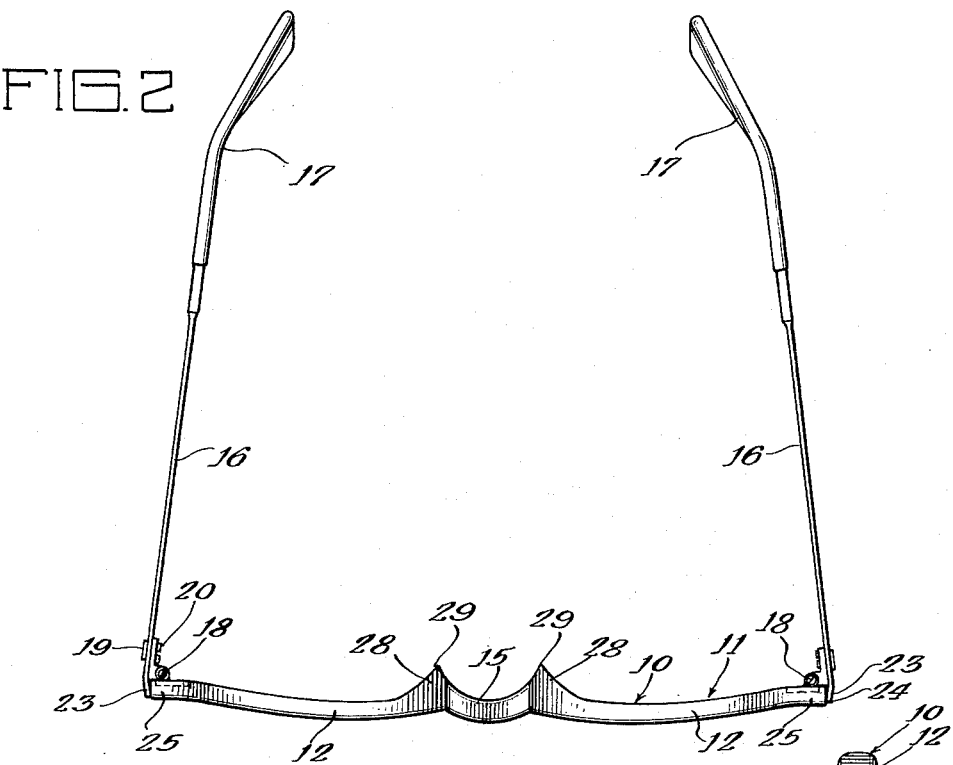
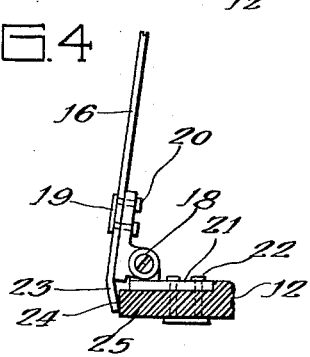
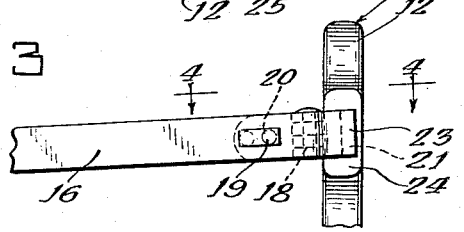
Inventors:
Paul Amundsen
John N. Liautaud
By: Wallace and Cannon
Attorneys Sept. 26, 1961  P. AMUNDSEN ET AL  3,001,200
EYE PROTECTIVE SPECTACLE TYPE GOGGLES
Filed Oct. 17, 1958  2 Sheets-Sheet 2

Inventors:
Paul Amundsen
John N. Liautaud
By: Wallace and Cannon
Attorneys

United States Patent Office 3,001,200
Patented Sept. 26, 1961

3,001,200
EYE PROTECTIVE SPECTACLE TYPE GOGGLES
Paul Amundsen, Wonder Lake, and John N. Liautaud, Chicago, Ill., assignors to Fendall Company, Chicago, Ill., a corporation of Illinois
Filed Oct. 17, 1958, Ser. No. 767,879
3 Claims. (Cl. 2—14)

This invention relates to an eye protective goggle of the spectacle type, and more particularly to such a device which is adapted to be worn by workmen and other employees in factories, and like places, to protect the eyes of the wearer from injury due to flying particles.

Various types of eye protective goggles have been known and used heretofore but none of them have been entirely satisfactory for a number of reasons which will be pointed out presently.

One of such reasons is the fact that because of variations in nose widths of individual wearers, eye protective goggles must be made in five varying bridge widths, ranging in sizes from 18 mm. to 26 mm., there being a 2 mm. variation in each size. Because of this fact, it has been necessary, heretofore, in order to fit their workmen, for an industrial plant to carry an inventory comprising all five bridge sizes. Not only does this require the maintenance of a very substantial inventory, but it is also quite troublesome to maintain an adequate stock of each particular size of such goggles. Moreover, should a firm find itself temporarily out of a particular size of such goggles, it will issue the closest size available in stock, regardless of the fact that the size of the goggles issued does not fit the workman to whom it is issued.

Another reason why prior art spectacle type goggles are unsatisfactory is that the design of the prior art bridge and nose pads embodied in such goggles does not conform to the configuration and shape of negroid type noses. Thus we have found that the nose pads of a conventional frame are too deep and set too low to accommodate the extremely shallow depth and broad flare of noses of this type.

A further reason why prior art types of goggles have not proven entirely satisfactory is encountered in the temples, that is, the means by which the spectacles of such goggles have been held in place on the wearer's face. Thus, there are two different types of temples in common use, namely, the cable type temple and the spatula or skull type of temple.

The rearward portion of a cable type temple comprises a plurality of fine wires wrapped around a central core to give this portion of the temple a degree of flexibility. This rearward portion is curled or generally circular in shape so that it fits around the ear of the wearer. Such flexibility is necessary to avoid undue pressure on the ear which is quite sensitive in the average individual. When originally issued or fitted to the wearer, the curled portion of such cable type temples is shaped or adjusted so that it will hold the spectacle in place without undue discomfort to the wearer. However, after a short wearing period, because of the flexibility of the fine wires in the cable portion of the temple, the curled, back-of-the-ear section of the temple elongates and does not hold the spectacle firmly in position on the face with the result that the spectacle constantly slips downward on the nose of the wearer. Moreover, if a cable temple is re-adjusted to overcome this difficulty, it is sometimes adjusted in too tight a manner causing soreness in back of the wearer's ear. In either case, these drawbacks result in complaints on the part of the wearer.

The spatula or skull type of temple is usually made of plastic material with a wire core as a means of imparting a degree of rigidity to the temple. The ability of this type of temple to hold the spectacle in position of use on the face of the wearer is dependent upon pressure on the side of the head in the area immediately above the wearer's ear. However, in spite of the wire core stiffening member embodied in such spatula type temples the plastic employed therein has a tendency to cold-flow outward in a direction away from the head of the wearer with the result that after a short wearing period the temple loses its holding power. This difficulty is overcome by attempting to bend or reshape the temple inwardly toward the head of the wearer but such bending or reshaping does not have a permanent effect. Moreover, the greater the degree of inward bending or reshaping the greater is the tendency for the temple to cold-flow outward. Hence, in the use of conventional spatula temples of this type, there is constant slipping and sliding of the spectacles in a downward direction on the nose of the wearer.

Both the cable type and the spatula type of temples used on plastic spectacles are attached to the spectacle front by means of a hinge and screw, the engaging surface between the front end portion of the temple and the spectacle frame front being a mitered joint. In a joint of this type it is not possible to vary the angle of the temple out of the plane of the spectacle frame front. However, in the present invention, we have found that, if it is necessary to change the angular relationship of the temples to each other and to the frame front this may most effectively be done at the joints where the temples are attached to the spectacle frame front.

Accordingly, an object of the present invention is to provide a new and improved eye protective spectacle type goggle which is so designed and constructed that it overcomes the above mentioned and other difficulties experienced in the use of prior art goggles of this type.

Another object of the present invention is to provide a new and improved spectacle type goggle which is so designed and constructed that it will fit the nose and face of practically any wearer regardless of the size and shape of the wearer's nose or face and without any special adjustment or fitting for that purpose.

An additional object of the present invention is to provide in the new goggles a simple adjustable means for fitting the occasional out-of-the-ordinary faces which may be encountered in industry, such faces being relatively few in number and being represented by individuals with extremely narrow or extremely wide facial characteristics.

An additional object of the invention is to provide a new and improved eye protective spectacle-type goggle embodying a novel design and construction of a nose bridge member and nose pads which are so shaped and are so positioned relative to the nose bridge member that they cooperate with the nose bridge member to support the goggles in proper vertical wearing position before the wearer's face.

Other and further objects of the present invention will be apparent from the following description and claims and are illustrated in the accompanying drawings, which, by way of illustration, show preferred embodiments of the present invention and the principles thereof and what we now consider to be the best mode in which we have contemplated applying these principles. Other embodiments of the invention embodying the same or equivalent principles may be used and structural changes may be made as desired by those skilled in the art without departing from the present invention.

In the drawings:

FIG. 1 is a front elevational view of an eye protective spectacle-type goggle embodying the present invention;

FIG. 2 is a top plan view thereof;

FIG. 3 is an enlarged fragmentary detail view showing the manner in which the temples are mounted on the lens frame front of our new goggles;

FIG. 4 is a fragmentary sectional plan view on line 4—4 in FIG. 3;

Figure 5:
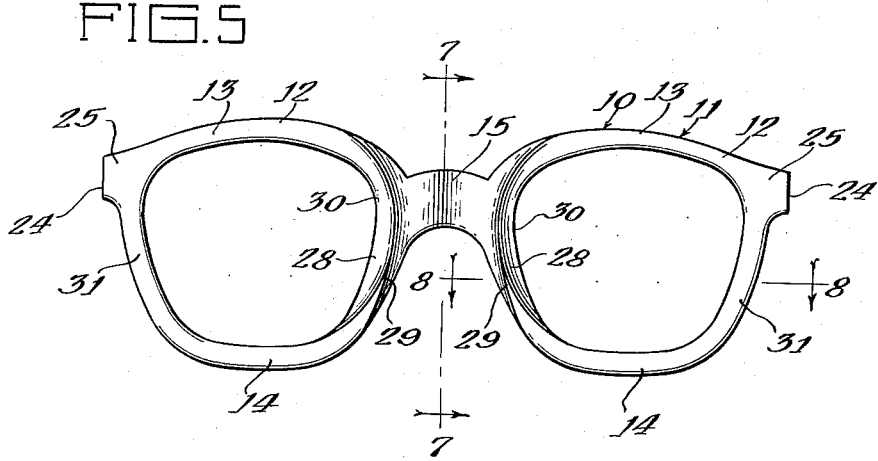
FIG. 5 is a rear elevational view of the frame front of our new eye protective spectacle-type goggle but showing the temples and the bridge mountings therefor removed from the frame front.
Figure 6:
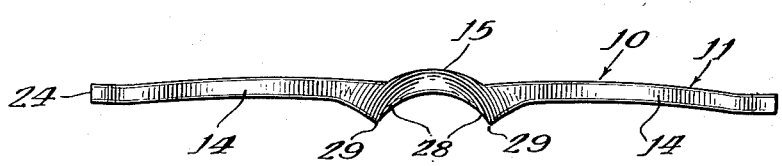
FIG. 6 is a top plan view of the frame front with the temples and bridge mountings therefor removed.

A preferred and typical embodiment of the present invention is illustrated in FIGS. 1 to 8, inclusive, of the drawings, wherein it is generally indicated at 10, and comprises a frame front 11 which may be made of any suitable material. Thus, for example, the frame front 11 may be molded or fabricated of synthetic resinous plastic material which may be, for example, cellulose acetate butyrate, or it may be die cast of any suitable metal such, for example, as an aluminum alloy. The frame front 11 includes a pair of lens frames 12 and a nose piece or nose bridge member 15 which extends between and is integrally joined to the lens frames 12.

Each of the lens frames 12 includes a top wall 13, a bottom wall 14, an inner vertically extending wall 30 and an outer vertically extending wall 31.

Each of the lens frames 12 is provided on its inner surface with a peripheral lens-retaining groove 26 (FIG. 8) which is adapted to receive an eye protective lens 27.

The new eye protective spectacle-type goggle of the present invention embodies a novel design, location and construction of nose bridge pads which cooperate with the nose bridge member 15 to align the lenses 27 in proper vertical position before the wearer's eyes and to enable the invention to properly fit persons having widely different nose and facial shapes and characteristics, and without the need or necessity, in most cases, for any rearrangement or adjustment of the new eye protective device itself. To this end each of the lens frames 12 has integrally molded therein on the rear surface of the inner vertical side wall 30 thereof, a nose pad 28 which has a relatively wide base at its inner end and tapers rearwardly to a relatively narrow rear edge portion 29 which extends a substantial distance rearwardly and is disposed substantially at the midpoint or vertical center line of the inner vertical wall 30 of the corresponding lens frame 12. Each of the nose pads 28 is arched rearwardly from a point above the nose bridge member 15 to a point substantially therebelow and each nose pad 28—29 merges into the top and bottom walls 13—14 of the corresponding lens frame 12 (FIGS. 5 to 8).

The design and construction of the bridge of the new eye protective spectacle-type goggle, as provided by the nose bridge member 15, and the nose bridge pads 28—29, enables the new eye protective device to be worn by any person regardless of the width, shape or contour of the wearer's nose, and without any adjustment or modification thereof.

Figures 7, 9:
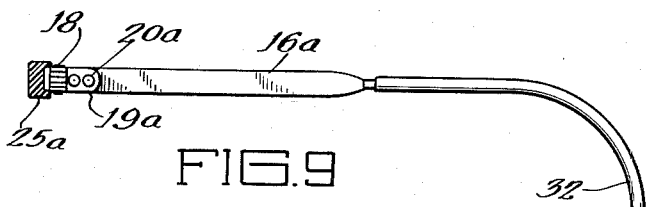
FIG. 7 is a sectional view on line 7—7 in FIG. 5.
FIG. 9 is a fragmentary plan view of a modification of our invention embodying temples of the cable type.

Thus it will be noted that the nose bridge pads 28—29 disposed in substantial horizontal alignment with the nose bridge member 15 and extend above and below the nose bridge member 15 (FIGS. 5 and 7). Hence the nose bridge pads 28—29 are so designed and constructed and are so positioned relative to the nose bridge member 15 that they cooperate with the nose bridge member 15 to support the new goggle in proper vertical wearing position before the eyes of the wearer. Moreover, the extension of portions of the nose bridge pads 28—29 above the nose bridge member 15 impart stability to the new goggle when worn and prevents wobbling or up and down or criss-cross movement of the goggles on the face of the wearer which might otherwise occur.

However, in the use of the new eye protective spectacle-type goggle the design and construction of the bridge 15—28—29 is necessarily such, in order to accomplish its substantially universal fit, that the new goggle would tend to slide down on the nose and face of the wearer if conventional temples were employed therein. Hence in order to overcome this difficulty a novel arrangement and construction of temples is provided, and which will now be described.

The new eye protective spectacle type goggle includes a pair of temples which may be either of the skull or spatula type or of the cable type, as previously described. In the form of the invention shown in FIGS. 1 to 8, inclusive, a pair of metal temples 16 of the skull or spatula type are employed, and each of such temples 16 includes a body having an enlarged inwardly extending resilient rear end portion 17 mounted thereon and which may be made of any suitable synthetic resinous elastomeric plastic material, rubber, or the like. The body portion of each of the temples 16 has an inwardly angled front end portion 23 which is adapted to engage and bear against a vertically extending bearing surface 24 which is formed on an outwardly extending projection or temple boss portion 25 which is formed as an integral part of the outer wall 31 of each lens frame 12 at the upper corner thereof. Each of the temples 16 is hingedly mounted, as at 18, by a pair of cooperating hinge members 19 and 21, to the adjacent temple boss or outwardly projecting portion 25 of the outer wall 31 of the corresponding lens frame 12. The hinge member 19 may be attached, as by welding, or by suitable fastening elements 20, to the front end portion of the adjacent temple 16, and the hinge member 21 may be attached, as by fastening elements 22, to the adjacent temple portion or boss 25 of the corresponding lens frame 12.

In the use of the new eye protective spectacle-type goggle, as shown in FIGS. 1 to 8, inclusive, of the drawings, the temples 16—17 may be mounted on the frame front 11, as shown, and the body portions of the temples 16—17 angled inwardly at a suitable angle, as shown in FIG. 2, to enable the rear end portions 17 of the temples to embrace the sides of the head of the wearer, adjacent to and directly above the ears, under sufficient spring tension to hold the new eye protective device in position of use on the head of the wearer. This is accomplished by bending or toeing the front end portion 23 of each temple 16 inwardly at a slight angle out of the plane of the body portion of the temple 16, so that it will engage the bearing surface 24 on the adjacent boss or temple portion 25 of the lens frame 12 (FIG. 4). When so arranged the temples 16—17 extend angularly inwardly relative to and toward each other, out of the plane of the sides of the frame front (FIG. 4), due to the engagement of the front end portions 23 of the temples 16—17 with the bearing surfaces 24. When the new goggle 16 is worn, the resilient and yieldable temples 16—17 are placed under tension, as an incident to being placed in position of use on the head of the wearer, whereupon they yieldably grip the head of the wearer and cooperate with the nose bridge structure 15—28—29 to maintain the new goggle in proper position of use on the wearer and without any downward sliding of the new goggle on the bridge of the nose of the wearer.

When set in their normal inwardly angled position, the temples 16—17 will, without adjustment, fit the great majority of faces. However, in the case of extremely narrow or extremely wide faces, it is desirable to change the angular relationship of the temples 16—17 relative to the frame front 11. Thus, on an extremely wide face, the standard angled position of the temples 16—17 might provide too much tension and prove uncomfortable to the wearer, whereas, on an extremely narrow face, the standard angled position of the temples 16—17, as shown in FIG. 2, might provide too loose a fit and fail to hold the goggle in position on the face of the wearer without downward sliding on the nose. While the percentage of extremely wide or narrow faces is very low, it is nevertheless desirable to provide some means of adjustment to accommodate these extremes. This is accomplished by changing the angle of bend in the front end portions 23 of the temples 16—17. Thus, only a very slight change in the angle of the front end portion 23 of the temples 16—17, relative to the body portion of each temple, will materially change the location of the rear end portion 17 of each temple. Hence, altering the angle of the bend in the front end portions 23 of the temples 16—17 in an outward direction will cause the rear end portion 17 of each temple 16 to angle outwardly and, conversely, if the angle of the front end portion 23 is altered inwardly, it will cause the rear end portions of the temples 16—17 to angle inwardly to a greater degree. Since the distance from the front end portion 23 to the rear end portion 17 of each of the temples 16—17 is approximately 4½ inches, it can be readily understood that any change in the position or angular relationship of the front end portion 23 of each temple 16—17 is greatly multiplied at the rear end portion thereof. Changing the angular position of the bend in the front end portion 23 of each temple 16—17, relative to the body portion of each temple, may easily be accomplished by means of pliers or any other suitable tool.

Figure 10:
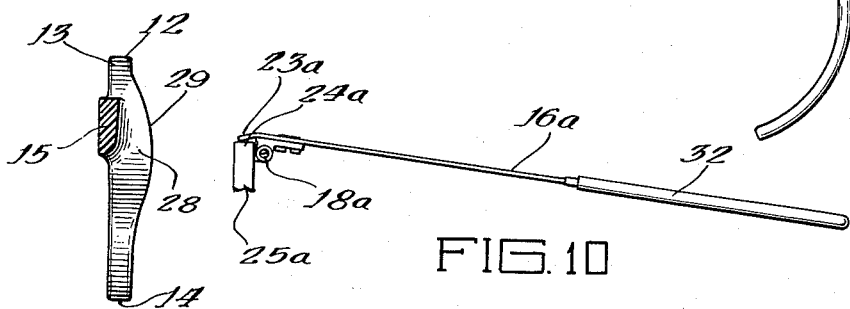
FIG. 10 is a side elevational view, partly in section, of the modification of the invention shown in FIG. 9.
Figure 8:
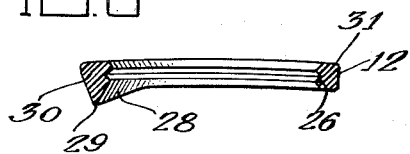
FIG. 8 is a sectional plan view on line 8—8 in FIG. 5.

A modification of the invention is illustrated in FIGS. 9 and 10 of the drawings, and those parts thereof which are similar or comparable to corresponding parts embodied in the form of the invention shown in FIGS. 1 to 8, inclusive, have been given similar reference numerals followed by the additional and distinguishing reference character "a."

In the form of the invention shown in FIGS. 9 and 10 of the drawings the temples 16a are of the cable type and each of the temples 16a includes a flexible curled rear end portion 32 which is adapted to extend around the external ear of the wearer, as heretofore described.

In the use of the form of the invention shown in FIGS. 9 and 10 the holding power of the cable type temples 16a is not wholly dependent upon the curved rear end portions 32, but is supplemented by the inwardly angled portion of the temples 16a, as shown in FIG. 10, and which in use bears against the areas directly above the ears of the wearer. Otherwise, however, the form of the invention shown in FIGS. 9 and 10 of the drawings is similar in construction to the form of the invention shown in FIGS. 1 to 8, inclusive, of the drawings, and functions in the same manner.

It will thus be seen from the foregoing description, considered in conjunction with the accompanying drawings, that the present invention provides a new and improved eye protective spectacle-type goggle having the desirable advantages and characteristics, and accomplishing its intended objects, including those hereinbefore set forth and others which are inherent in the invention.

We claim:

1. An eye protective spectacle type goggle comprising a frame front including a pair of lens frames and a nose bridge member extending between and interconnecting said lens frames, each of said lens frames having a front surface and a rear surface and including an outer side wall and an inner side wall and each of said inner side walls having a nose bridge pad on the rear surface thereof, said nose bridge pads having portions disposed in substantial horizontal alignment with said nose bridge member, each of said lens frames including a temple-mounting portion, a pair of temples each hingedly mounted on one of said temple-mounting portions, the said outer side wall of each of said lens frames having a bearing surface thereon disposed between the said front and rear surfaces of said lens frames, and each of said temples having a front end portion disposed forwardly of the said hinged mounting thereof and engageable with one of said bearing surfaces, the said front end portions of said temples being bendable toward and away from said bearing surfaces to position and maintain said temples in a pre-selected position relative to said frame front and relative to each other.

2. An eye protective spectacle type goggle comprising a frame front including a pair of lens frames and a nose bridge member extending between and interconnecting said lens frames, each of said lens frames having a front surface and a rear surface and including an outer side wall and an inner side wall and each of said inner side walls having a nose bridge pad on the rear surface thereof, said nose bridge pads having portions extending vertically above and below said nose bridge member, each of said lens frames including a temple-mounting portion, a pair of temples each hingedly mounted on one of said temple-mounting portions, the said outer side wall of each of said lens frames having a bearing surface thereon disposed between the said front and rear surfaces of said lens frames, and each of said temples having a front end portion disposed forwardly of the said hinged mounting thereof and engageable with one of said bearing surfaces, the said front end portions of said temples being bendable toward and away from said bearing surfaces to position and maintain said temples in a pre-selected position relative to said frame front and relative to each other.

3. An eye protective spectacle type goggle comprising a frame front including a pair of lens frames and a nose bridge member extending between and interconnecting said lens frames, each of said lens frames having a front surface and a rear surface and including an outer side wall and an inner side wall and each of said inner side walls having a nose bridge pad on the rear surface thereof, said nose bridge pads being disposed in substantial horizontal alignment with said nose bridge member, each of said lens frames including a temple-mounting portion, a pair of temples each hingedly mounted on one of said temple-mounting portions, and means including a bendable substantially flat metallic element cooperating with each of said lens frames and temples extending forwardly of said hinged mounting and rearwardly from adjacent the front surface of the said lens frame when in use and bendable toward and away from the outer side wall of said lens frames to position and maintain each of said temples in a pre-selected position relative to said frame front and relative to each other.

References Cited in the file of this patent

UNITED STATES PATENTS

| | | |
|---|---|---|
| 625,083 | Belt | May 16, 1899 |
| 2,561,402 | Nelson | July 24, 1951 |
| 2,630,569 | Baratelli | Mar. 10, 1953 |
| 2,632,164 | Hanford | Mar. 24, 1953 |
| 2,652,747 | Maleck | Sept. 22, 1953 |
| 2,774,279 | Olson et al. | Dec. 18, 1956 |

FOREIGN PATENTS

| | | |
|---|---|---|
| 439,264 | Great Britain | Dec. 3, 1935 |